Patented Mar. 12, 1940

2,193,677

UNITED STATES PATENT OFFICE 2,193,677

ORTHO-HYDROXY CARBOXYLIC ACIDS

Friedrich Wilhelm Muth, Leverkusen-I. G.-Werk, Germany, assignor to General Aniline & Film Corporation, a corporation of Delaware No Drawing. Application April 5, 1938, Serial No. 200,128. In Germany April 12, 1937

4 Claims. (Cl. 260—520)

The present invention relates to new o-hydroxy-carboxylic acids, more particularly it relates to 3-hydroxyfluorene-2-carboxylic acids and to a process of preparing the same.

It is known that both phenol and β-naphthol yield two isomeric hydroxy carboxylic acids by Kolbe's synthesis. From U. S. P. 1,867,049 it is known that 2-hydroxyfluorene-o-carboxylic acids are obtained by causing carbon dioxide to react upon 2-hydroxyfluorene in the presence of an alkali metal hydroxide or carbonate or upon an alkali metal salt of 2-hydroxyfluorene at higher temperature and at higher pressure. In this way a mixture of two 2-hydroxyfluorene-o-carboxylic acids is obtained, namely 60% of 2-hydroxyfluorene-3-carboxylic acid and 40% of 2-hydroxyfluorene-1-carboxylic acid. Further it is known from Beilstein's "Handbuch der organischen Chemie," Berlin 1932, vol. IX, first supplement, page 291, that fluorene-sodium combines with carbon dioxide to fluorene-9-carboxylic acid. Finally experiments have shown that it is not possible, even under strong conditions, to transform 3-hydroxyfluorenone into its carboxylic acids.

Now it has been found that 3-hydroxyfluorenes with free 2- and 4-positions, which otherwise may contain any substituent, easily form o-carboxylic acids by the action of carbon dioxide thereupon in the presence of alkali metal hydroxides or carbonates or upon the alkali metal salts of the said 3-hydroxyfluorenes. It is surprising that in this reaction no isomeric-o-carboxylic acids are formed but uniformly the 3-hydroxyfluorene-2-carboxylic acids; moreover, the new 3-hydroxy-2-carboxylic acids are formed in good yield under mild conditions, especially under as low a carbon dioxide pressure as about 3 atmospheres.

The new o-hydroxy-carboxylic acids are easily crystallizing substances which melt with elimination of carbon dioxide. They are soluble in alkali metal carbonates from which solutions the alkali metal salts of the new acids can be separated in crystallized form. With ferric chloride in alcoholic solution they give characteristic color reactions. They are valuable intermediates for the manufacture of dystuffs and therapeutical agents.

The starting materials, 3-hydroxy-fluorenes are obtainable, for instance, by replacing in the corresponding 3-halogen-compounds the halogen by hydroxyl or from the corresponding 3-amino-compounds by diazotizing and boiling in the presence of sulfuric or phosphoric acid. Other known methods for the preparation of the starting materials will be mentioned in the various examples.

The following examples illustrate the invention, without however, restricting it thereto, the parts being by weight.

Examples 100 parts of the 3-hydroxyfluorene are converted in the usual manner into the sodium salt, filled into an autoclave and heated for about 10–12 hours at about 200° C. under a carbon dioxide pressure of 3 atmospheres. After cooling the reaction mass is dissolved in hot water. On cooling, the sodium salt of the new 3-hydroxyfluorene-2-carboxylic acid crystallizes out. The free 3-hydroxyfluorene-2-carboxylic acid of the formula

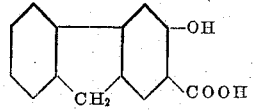

crystallizes from butyl alcohol in brilliant rods melting at 282° C.

The 3-hydroxyfluorene used above crystallizes in white needles of M. P. 136–137° and can be obtained from 3-bromo-fluorene described in "Journal Am. Chem. Soc.", 57, II, P. 2448, by heating with caustic soda lye under pressure in a manner similar to that described in British Patent No. 427,816.

In a similar manner, substituted 3-hydroxyfluorene-2-carboxylic acids may be obtained. Thus, for instance, the 6-methyl-3-hydroxyfluorene-2-carboxylic acids is obtained by the action of carbon dioxide upon 6-methyl-3-hydroxyfluorene in the presence of alkali metal hydroxides or carbonates or upon an alkali metal salt of the said 6-methyl-3-hydroxyfluorene. The 6-methyl-3-hydroxyfluorene-2-carboxylic acid of the formula:

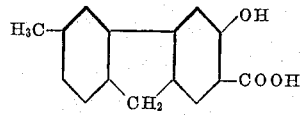

crystallizes from butyl alcohol in needles of the melting-point 272–273° C. The 6-methyl-3-hydroxyfluorene used above is obtainable in the following way:

4-methyl-2-amino-benzoic acid is caused to react with benzene sulfochloride to form 4-methyl-2-benzenesulfamido-benzoic acid (M. P. 190–191° C.). This acid is converted into the 4-methyl-2-benzenesulfamidobenzoyl chloride (M. P. 162–163° C.) and the latter condensed with anisol to 4-methyl-2-benzenesulfamido-4'-methoxybenzophenone (M. P. 124–125° C.); this product is saponified to 4-methyl-2-amino-4'-methoxybenzophenone, then diazotized and with ring formation condensed to the 6-methyl-3-methoxyfluorenone (M. P. 127° C.). This is then reduced to 6-methyl-3-methoxyfluorene (colorless leaflets of M. P. 115-116° C.) and then demethylated to 6 - methyl - 3 - hydroxyfluorene (needles of M. P. 165-166° C.). If above instead of 4-methyl-2-aminobenzoic acid 3-methyl-2-aminobenzoic acid, 5 - methyl - 2 - aminobenzoic acid and 6-methylaminobenzoic acid respectively are used, finally the corresponding 5-, 7- or 8-methyl - 3 - hydroxyfluorene-2 - carboxylic acids are obtained. In analogous manner 4-chloro-2-aminobenzoic acid can be converted into 3-methoxy-6-chlorofluorenone (M. P. 178° C.); the latter is then reduced to 3-methoxy-6-chlorofluorene (M. P. 105° C.), demethylated and carboxylated. Instead of chlorine the starting component may contain fluorine, bromine or CF₃.

Also methoxy-3 - hydroxyfluorene-2-carboxylic acid of the formula

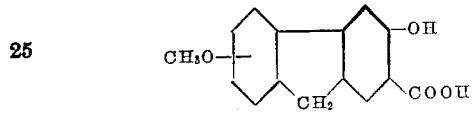

may be obtained according to the present invention. In this case a nitro-2-aminobenzoic acid is used as starting material and finally after the various reactions, the nitro group is reduced to the amino group, diazotized and boiled in the presence of phosphoric acid.

Besides the above mentioned substituted 3-hydroxyfluorene-2-carboxylic acids also such 3-hydroxyfluorenes-2-carboxylic acids may be prepared which contain a further benzene nucleus condensed therewith, for instance, the 6, 7-benzo-3-hydroxyfluorene-2- carboxylic acid of the formula:

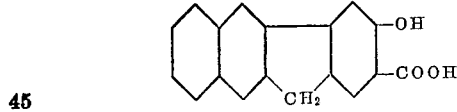

which melts at 286° C.

6, 7-benzo-3-hydroxyfluorene used for its preparation is obtained as follows:

2-naphthylamine-3-carboxylic acid is caused to react with benzosulfo chloride to form 2-benzenesulfamidonaphthalene - 3 - carboxylic acid (M. P. 230° C.). This is converted into the acid chloride (M. P. 192° C.) condensed with anisol to 2-benzenesulfamido-4, 5-benzo-4'-methoxy-1, 1'-benzophenone (M. P. 172° C.), saponified to 2-amino-4, 5-benzo-4'-methoxy-1, 1'-benzophenone, diazotized and with ring formation condensed to 6, 7-benzo-3-methoxyfluorenone (M. P. 137-138° C.) reduced to 6, 7-benzo-3-methoxy-fluorene (M. P. 145-146° C.) and demethylated to 6, 7-benzo-3-hydroxyfluorene (M. P. 229-230° C.). If instead of 2-naphthylamine-3-carboxylic acid 2-naphthylamine-1-carboxylic acid is used in analogous manner, 7,8-benzo-3-hydroxyfluorene-2-carboxylic acid is obtained and when starting from 1-naphthylamine-2-carboxylic acid 5, 6-benzo-3-hydroxyfluorene-2-carboxylic acid is obtained.

Similarly also hydrogenated nuclei may be condensed to the fluorene system. Thus 6, 7-tetrahydrobenzo-3-hydroxyfluorene-2-carboxylic acid is obtained by starting in the above reaction with 2-amino-tetrahydronaphthalene-3-carboxylic acid.

I claim:

1. As new products, hydroxy-o-carboxylic acids of the general formula:

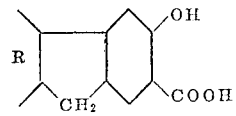

wherein R stands for one of the groups consisting of the benzene nucleus, alkyl-substituted benzene nucleus, and the naphthalene nucleus.

2. As a new product the 3-hydroxyfluorene-2-carboxylic acid of the formula

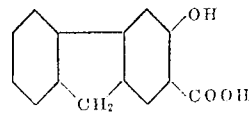

melting at 282° C.

3. As a new product the 6-methyl-3-hydroxyfluorene-2-carboxylic acid of the formula

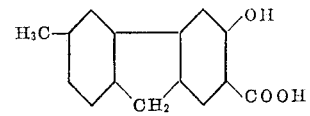

melting at 272-273° C.

4. As a new product the 6, 7-benzo-3-hydroxyfluorene-2-carboxylic acid of the formula

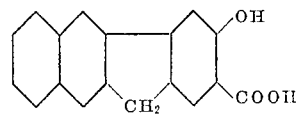

melting at 286° C.

FRIEDRICH WILHELM MUTH.